March 18, 1941.　　S. H. ATKINSON　　2,235,307
SEALING MEANS
Filed Dec. 6, 1938　　2 Sheets-Sheet 1
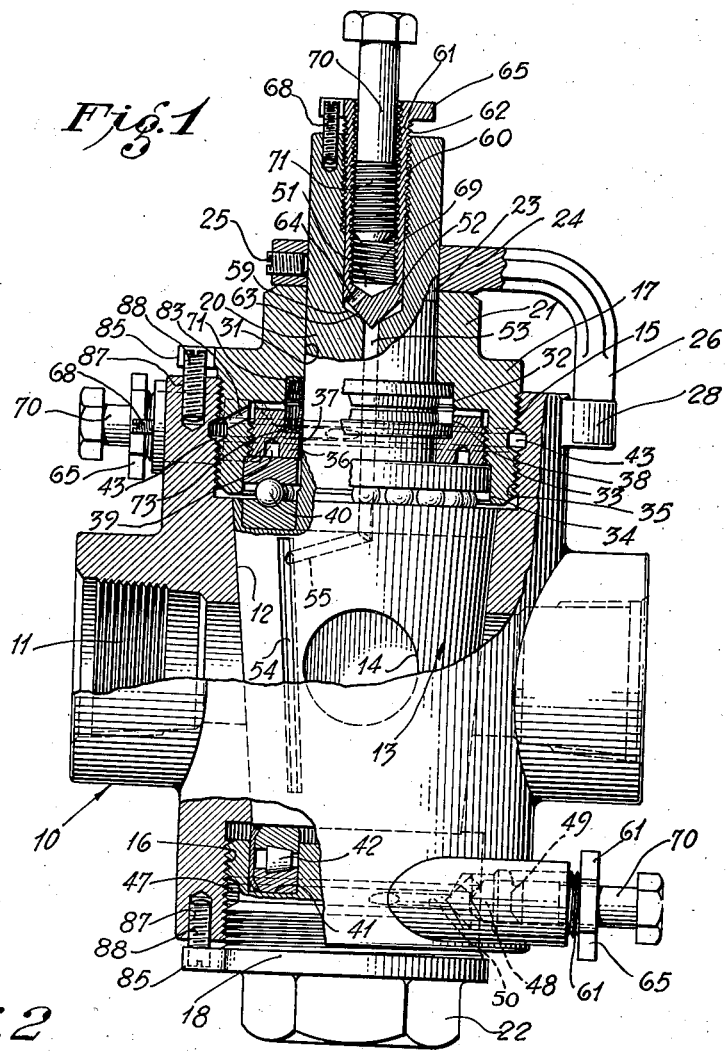
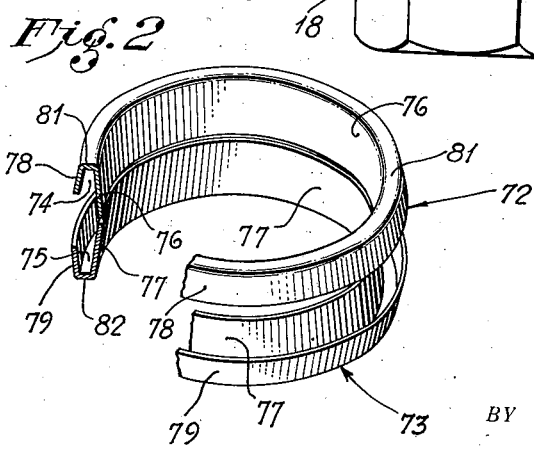
STANLEY H. ATKINSON,
INVENTOR.
BY Robert M. McManigal
ATTORNEY March 18, 1941.  S. H. ATKINSON  2,235,307
SEALING MEANS
Filed Dec. 6, 1938   2 Sheets-Sheet 2
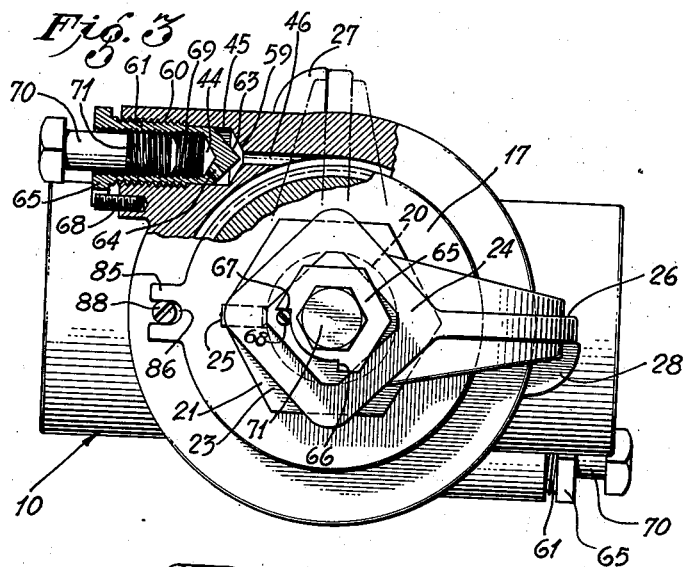
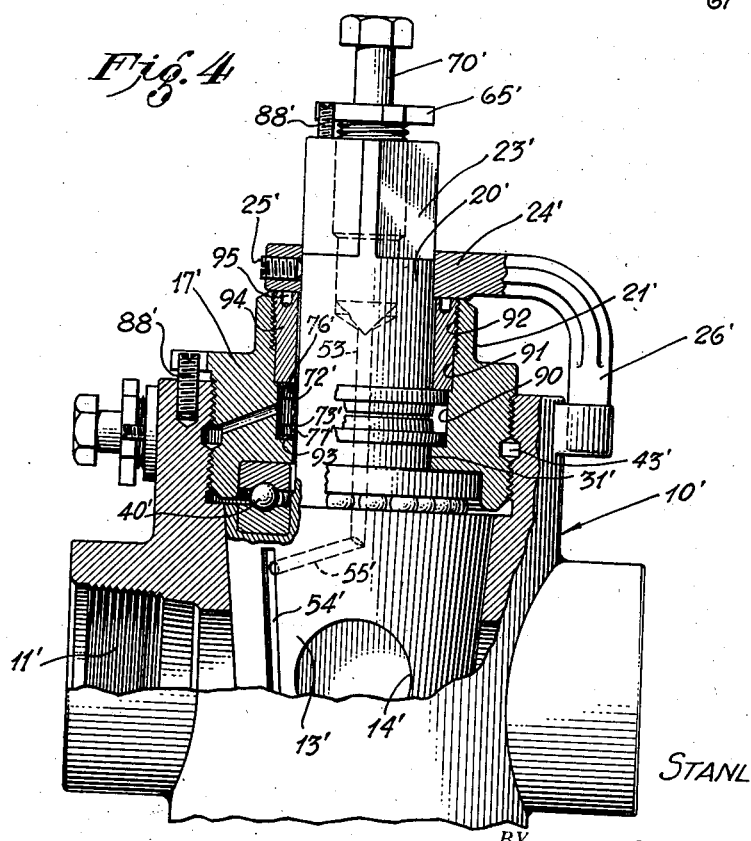
STANLEY H. ATKINSON,
INVENTOR.
BY Robert M. McManigal
ATTORNEY Patented Mar. 18, 1941

2,235,307

UNITED STATES PATENT OFFICE 2,235,307

SEALING MEANS

Stanley H. Atkinson, Compton, Calif., assignor to MacClatchie Manufacturing Company of California, Compton, Calif., a corporation of California Application December 6, 1938, Serial No. 244,215

4 Claims. (Cl. 251—103)

This invention relates to a sealing means for a seating or bearing surface and for the purpose of illustration is herein described as applied to a plug valve.

In certain plug valves, sealing rings are used which are expanded into sealing engagement by fluid pressure caused by the leakage of the fluid in the flow line which is controlled by the plug valve and by lubricant pressure applied to the lubricant which is adapted to lubricate the valve.

The disadvantage is that the fluid from the flow-line not only causes the sealing rings to expand, but also dissolves or washes away the lubricant which lubricates the valve. Another disadvantage is that the fluid in the line also has a deleterious effect on the sealing rings, which are usually constructed of rubber, leather, or like material.

It is therefore an object of my invention to provide a sealing means in which the seal is maintained entirely by a sealing liquid, which liquid is entirely out of contact with the fluid in the flow-line.

A further object of the invention is to provide a sealing means for valves, pumps, bearings, and other objects having surfaces which are required to be sealed off under high pressure operating conditions without interfering in any manner whatever with the operation of the device.

A further object of this invention is to provide a sealing means for valves, pumps, bearings, and other objects having relatively movable surfaces which are required to be sealed off under high pressure operating conditions in which the sealing means is so mounted that the sealing fluid cannot move either of said relatively movable surfaces.

A further object of the invention is to provide a sealing means for plug valves and the like in which the sealing liquid does not exert a longitudinal force on the plug urging the plug against its seat.

Another object of my invention is to provide a sealing means which is inexpensive to manufacture and which is easy and convenient to install.

More particularly, it is an object of my invention to seal a plug valve by means of cooperating sealing rings having annular grooves which are adapted to face each other, in which the outer edges of said annular grooves are adapted to be held in sealing engagement by means of the sealing liquid pressure, in which the sealing liquid cannot escape into the flow line, in which fluid from the flow line which is controlled by the valve is maintained entirely out of contact with said annular grooves, and in which the sealing liquid pressure cannot urge the plug against its seat.

My invention has many other objects, advantages, and features, some of which, with the foregoing, will be set forth at length in the following description where I shall outline certain forms of the invention, which I have selected for illustration in the drawings accompanying and forming a part of the present specification. In the said drawings, I have shown certain forms of my invention as applied to plug valves, but it is to be understood that I do not limit myself to such forms, since the invention, as expressed in the claims, may be embodied in a large plurality of forms.

Referring to the drawings:

Fig. 1 is a longitudinal section of a plug valve embodying the features of the invention.

Fig. 2 is an enlarged perspective view of the sealing rings shown in Fig. 1.

Fig. 3 is a plan view of the plug valve shown in Fig. 1 with parts broken away, with both the plug valve and the lubricating means in the plug stem in closed position.

Fig. 4 is a longitudinal section of a portion of a plug valve illustrating a modified form of the invention.

The invention is applicable to any article having surfaces requiring lubrication under high pressure operating conditions, for example, a plug valve.

The plug valve shown in Figs. 1-3 inclusive, comprises a valve casing 10 having a fluid passageway 11 and longitudinal opening 12 with a valve plug 13 rotatable in longitudinal opening 12, said valve plug having a transverse hole 14 adapted for alinement or non-alinement with fluid passageway 11 when the plug is rotated. The peripheral surfaces of the opening 12 and the valve plug 13 cooperate to define a seating surface for the valve plug. The upper and lower parts of the opening 12 are counterbored and threaded as indicated at 15 and 16 respectively.

A means cooperates with valve casing 10 for retaining the valve plug in operative assembly, and in the present instance this means is shown as upper retaining nut 17 which is adapted to be screwed into the upper threaded end 15 of the opening 12 and lower retaining nut 18 which is adapted to be screwed into the lower threaded end 16 of the opening 12. The valve plug 13 is provided with means for rotating the valve plug, which may comprise a plug stem 20 integral with the valve plug and projecting through the retaining nut 17. The retaining nuts 17 and 18 and the plug stem 20 are provided with heads 21, 22 and 23, respectively, which are adapted for engagement by suitable tools.

The valve plug is limited to a quarter turn. As an instance of this arrangement a collar 24 is mounted on the plug stem 20 by means of a set screw 25 and is provided with an arm 26 which is adapted for limited movement between the stops 27 and 28 which are secured to the valve casing 10.

The upper retaining nut 17 is provided with a bore 31 to accommodate the plug stem 20, a counterbore 32, another counterbore 33 and a still larger counterbore 34. The counterbore 33 is threaded as indicated by the numeral 35. A sealing ring retainer 36 is adapted to be threaded into the counterbore 33 and is provided with a bore 37 to accommodate the plug stem 20 and a counterbore 38 on its upper side. The purpose of the counterbores 32 and 38 will be explained hereinafter. The sealing ring retainer 36 is also provided with spanner holes 39 which are adapted for engagement by suitable tools.

The counterbore 34 provides space for the ball bearing 40. An anti-frictional bearing is thus provided between the valve plug 13 and the upper retaining nut 17, when said retaining nut has been screwed into the threaded end 15 of the opening 12, and the valve plug may then be freely rotated relative to the upper retaining nut 17 for opening or closing the plug valve.

An annular groove 41 is provided in the upper end of the lower retaining nut 18 and a roller bearing 42 is adapted to be inserted therein. An anti-frictional bearing is thus provided between the valve plug 13 and the lower retaining nut 18, when said retaining nut has been screwed into the threaded end 16 of the opening 12 for seating the valve plug 13 relative to the bearing surface of opening 12, and the valve plug may then be freely rotated relative to said lower retaining nut 18 for opening or closing the valve.

Means are provided to positively and definitely seal the upper retaining nut 17 and the lower retaining nut 18 from the valve casing 10. As an instance of this arrangement, an annular groove 43 is provided partly in the outer periphery of the upper retaining nut 17 and partly in the inner periphery of the threaded end 15 of the opening 12. Obviously, this annular groove might be provided entirely in the inner periphery of the threaded end 15 adjacent said upper retaining nut 17 or entirely in the outer periphery of said retaining nut. The annular groove 43 communicates with a sealing liquid chamber 44 which is provided in enlarged lateral bore 45 in the valve casing 10 by means of lateral bore 46.

A like means is provided to positively and definitely seal off the lower retaining nut 18 from the valve casing 10. Annular groove 47 is provided in the outer periphery of the lower closure nut 18 adjacent the threaded end 16 of the opening 12. Instead of providing the annular groove 47 in the outer periphery of the retaining nut 18 it might be provided in the inner periphery of the threaded end 16 adjacent said retaining nut 18 or partly in the outer periphery of said retaining nut 18 and partly in the inner periphery of said threaded end 16. The annular groove 47 communicates with a sealing fluid chamber 48 which is provided in an enlarged lateral bore 49 in the lower part of the valve casing 10 by means of a lateral bore 50.

The plug stem 20 is provided with a lubricant chamber 51 which is provided in enlarged axial bore 52 in the upper end of said plug stem, and an axial bore 53 in the lower end of said plug stem.

Longitudinal grooves 54 are provided at the seating surface of the valve, and are connected to the lubricant chamber 51 in the plug stem 20 by means of axial bore 53 and a lateral bore 55.

Fluid chambers 44, 48, and 51, may be similar in construction and are provided with means so that the fluid may be forced from said fluid chambers under pressure and preferably with check means in order to prevent the return of the fluid under pressure to the fluid chambers. Although check means of usual construction and mode of operation may be used, I prefer to use the check means illustrated in the drawings.

Said check means does not constitute a part of the present invention. It is the invention of one John W. MacClatchie, as embodied in copending application entitled, "Lubricating Means," Serial No. 223,676, filed August 8, 1938. In this construction, the lower ends of the bores 45, 49, and 52 form tapered seats 59, and the outer ends of said bores are provided with left-handed threads 60 into which cylinders 61 provided with like left-handed threads 62 are adapted to be screwed. Each cylinder 61 is provided with a tapered seating surface 63, the angle of said seating surface 63 to the axis of the bore in which the cylinder is threaded, in each instance, being no greater, and preferably appreciably smaller, than the angle formed by the tapered seat 59 to the axis of the bore in which the cylinder 61 is threaded. This is in order to provide definite, absolute, and positive shut-offs or seals when the cylinders 61 are in closed position.

The cylinders 61 are constructed with bores and thus provide fluid chambers 44, 48, and 51. An opening 64 is provided through the tapered seating surface 63 of each cylinder 61 which opening is located as far from the center of the cylinder as convenient. As shown in Figure 3, the outer ends of the cylinders 61 may be provided with hexagonal nuts 65, part of which may be cut away as at 66 and 67. Stop pins 68 may be threaded into the top of the plug stem and the sides of the valve casing 10 within the periphery of the hexagonal nuts 65 in order to limit the movement of the cylinders 61 between closed and a limited open position.

The cylinders 61 are also provided with right-handed internal threads 69 to accommodate pressure screws 70 which are provided with similar threads 71.

The plug valve is adapted to be sealed off by means of the sealing means of my invention. In the embodiment of my invention shown in the drawings, the sealing means consists of two annular sealing rings 72 and 73, which may be constructed of stainless steel, or other suitable material which is not affected by the fluid in the line flow which is controlled by the valve. The sealing rings are provided with oppositely disposed annular grooves 74 and 75, respectively, and are adapted to be mounted one above the other around the plug stem 20 in counterbores 32 and 38 respectively.

The inner sides 76 and 77 respectively of the sealing rings 72 and 73 are somewhat longer than the outer sides 78 and 79 respectively, in order to maintain said sealing rings in proper position. The sides of said rings are preferably tapered outwardly toward the outer ends of the annular grooves 74 and 75. However, the sides of said rings need not necessarily be tapered, or only the inner sides 76 and 77 of said rings may be tapered outwardly.

The base 81 of the sealing ring 72 is preferably slightly smaller in diameter than the difference between the diameters of the counterbore 32 and the plug stem 20, whereas the distance between the grooved end of said sealing ring is preferably slightly greater than the difference between the diameters of said counterbore 32 and the plug stem 20. This construction insures a tight metal to metal engagement between the outer portions of said sides of said sealing ring and the valve stem 20 and the retaining nut 17 respectively.

The base 82 of the sealing ring 73 is likewise preferably smaller in diameter than the difference between the diameters of the counterbore 38 and the plug stem 20, whereas the distance between the other end of said sealing ring is preferably slightly greater than the difference between the diameters of said counterbore 38 and plug stem 20. This construction insures a tight metal to metal engagement between the outer portions of said sides of said ring and the plug stem 20 and the sealing ring retainer 36.

The space between the sealing rings 72 and 73 communicates with the fluid chamber 44 by means of lateral bore 46, annular groove 43, and lateral bore 83.

In assembling the parts, the valve plug 13 being withdrawn from the valve casing, the roller bearing 42 is inserted in the annular groove 41 of lower retaining nut 18 and said lower retaining nut is then screwed into the lower threaded end 16 of the longitudinal opening 12.

The valve plug 13 is then inserted in the opening 12 and the ball bearing 40 is then positioned on the valve plug around the plug stem. The sealing ring 72 is then placed in counterbore 32 of the upper retaining nut 17, and the sealing ring 73 is then placed in counterbore 38 of the sealing ring retainer 36. The sealing ring retainer 36 is then threaded into the upper retaining nut 17. The upper retaining nut 17 is then screwed into the upper threaded end 15 of longitudinal opening 12 and the threaded engagement of said retaining nut 17 axially shifts the valve lug until it is properly seated in the valve casing and on the anti-friction bearing 42. After the valve plug is properly seated, it may be secured in proper adjustment. As an instance of this arrangement the retaining nuts 17 and 18 may be provided with enlarged portions 85, said portions having grooves 86. After the valve plug is properly adjusted in the valve casing 10, threaded openings 87 are made in said valve casing in line with said grooves 86 and set screws 88 are screwed into said threaded opening 87, thereby securing said valve plug in proper adjustment in said valve casing.

In order to supply a sealing fluid under pressure to the annular grooves 74 and 75 and thereby maintain the adjacent edges of the inner sides 76 and 77 of sealing rings 72 and 73, respectively, in sealing engagement with the adjacent surfaces of the plug stem 20, the upper retaining nut 17 and the sealing ring retainer 36, respectively, the cylinder 61 in lateral bore 45 is turned to the right by means of hexagonal nut 65 until the stop pin 68 is engaged, thereby raising said cylinder 61 from the tapered seat 59. By turning the pressure screw 70 in the fluid chamber 44 to the right, the sealing fluid in said chamber is forced through the opening 64, lateral bore 46, annular groove 43, and lateral bore 83 into the annular grooves 74 and 75 thereby maintaining the inner sides of said annular grooves in sealing engagement with the surface of said plug stem and the outer sides of said sealing rings in engagement with the upper retaining nut 17 and the sealing ring retainer 36 respectively. After sufficient sealing fluid has been forced into said annular grooves 43, 74, and 75, the cylinder 61 in said lateral bore 45 is again turned to the left into closed position, and is adapted to remain in said position during the normal operation of said valve.

I prefer to use a semi-solid grease containing asbestos fibers as the sealing fluid, although any suitable sealing fluid may be used.

Lubricant is then forced into the grooves 54 between the plug and the casing in a similar manner. In other words, the cylinder 61 in the axial bore 52 in the plug stem is turned to the right by means of the hexagonal nut 65 until the stop pin 68 is engaged, thereby raising said cylinder 61 from its tapered seat 59. By turning the pressure screw 70 to the right, the lubricant is forced from the lubricant chamber 51 through the opening 64, axial bore 53 and the lateral bore 55 into the longitudinal grooves 54. After sufficient lubricant has been forced into said longitudinal grooves 54, the cylinder 61 is again turned to the left into closed position, and is adapted to remain in said position during normal operating conditions until it is again desired to lubricate said plug valve.

The annular groove 47 is then filled with sealing fluid under pressure from sealing fluid chamber 48 in a similar manner.

The valve is then ready for use, the plug stem 20 being rotated to open or close the valve by alining or non-alining transverse hole 14 with the fluid passageway 11. The valve may be conveniently lubricated and the lubricant replenished during normal high pressure operating conditions at will, without interfering in any manner whatever with the operation of the valve.

When any cylinder 61 is in closed position, the pressure screw 70 in said closed cylinder may be removed and new lubricant or sealing fluid in the form of conventional sticks or otherwise inserted in the fluid chamber after which the pressure screw 70 is again screwed into said cylinder chamber. At all times during re-charging, the fluid in the plug valve below the lubricant chamber is positively and absolutely prevented from escaping through said fluid chambers.

The pressure of the sealing fluid against the sides of the sealing rings is at all times greater than the pressure of the fluid in the flow-line. The result is that the sealing fluid is positively retained in said sealing means and fluid from the flow-line is positively prevented from leaking between the inner sides of said sealing rings and the plug stem 20 and between the outer sides of said sealing rings and the sealing ring retainer 36 and the upper retaining nut 17.

It will be readily seen that since the sealing ring retainer 36 is secured to the upper retaining nut 17, that the pressure of the sealing fluid cannot exert any force tending to urge the valve plug against its seat.

In Figure 4, I have illustrated a slightly modified form of the sealing means of my invention. In this form, instead of providing the sealing ring retainer below the sealing rings, the sealing ring retainer is provided in the upper retaining nut above the sealing rings. As shown in Figure 4, the upper part of the upper retaining ring 17' is provided with a bore 31' to accommodate the plug stem 20', a counterbore 90 for the sealing rings 72' and 73' and a slightly larger counterbore 91, which is threaded as indicated at 92. The lower part of the counterbore 90 forms a shoulder 93, and the sealing ring 72' is forced down around the plug stem 20' until it rests on the shoulder 93. The upper sealing ring is then forced down around the plug stem 20' until the edges of the inner sides 76', and 77' of said sealing rings are just a very small distance apart. A sealing ring retainer 94 which may be provided with spanner holes 95 for engagement by suitable tools is then threaded into the counterbore 91 of the upper retaining nut 17'. The collar 24' is then mounted on the plug stem 20' by means of set screw 25'. The remainder of the construction of the valve, the assembly, and the operation of said valve are deemed to be evident to those skilled in the art from the description set forth herein in connection with the form of the invention shown in Figs. 1-3 inclusive and will therefore not be set forth herein.

In operating plug valves provided with said sealing means, the valve plug may be rotated as desired with a minimum of effort, even though the plug valve is placed in a high pressure flow-line.

While the invention has been particularly described with reference to a plug valve, it will be noted that the sealing means of my invention is applicable to any structure wherein fluid is to be sealed off between cooperating elements.

From the foregoing description taken in connection with the accompanying drawings, the uses, advantages, and operation of the sealing means of my invention will be readily understood by those skilled in the art to which the invention appertains. While I have described the principle of operation together with the forms of my invention as applied to plug valves which I now consider to be the best embodiment thereof, I desire to have it understood that the articles shown are merely illustrative and that the invention is not to be limited to the details disclosed herein, but is to be accorded the full scope of the appended claims.

I claim:

1. A valve for use in high pressure fluid lines comprising a valve casing, a valve plug rotatably mounted in said casing, said valve plug including an operating stem projecting from said casing, an annular member surrounding said operating stem and secured to said valve casing in such position as to restrain said valve plug against axial movement, a circumferential recess between said operating stem and said annular member, a pair of resilient sealing rings each having an annular groove in one side thereof, said sealing rings being disposed in said circumferential recess in such manner that said annular grooves face each other, means for injecting a packing composition under pressure into said circumferential recess between the grooves in said sealing rings whereby said sealing rings are urged into sealing engagement with said operating stem and said annular member to thus prevent leakage of fluid and packing composition around said operating stem and to seal fluid from contact with said packing composition without exertion of axial forces on said valve plug.

2. A valve for use in high pressure fluid lines comprising a valve casing, a valve plug rotatably mounted in said casing, said valve plug including an operating stem projecting upwardly therefrom, an annular member surrounding said operating stem and secured to said valve casing in such position as to restrain said valve plug against axial movement, a circular recess between said annular member and said operating stem on said valve plug, a grooved resilient sealing ring having a cross-section of substantially U-shape disposed in said circular recess in such manner that the grooved side faces away from that surface of said valve plug in contact with fluid in the fluid line, means for injecting a packing composition into said circular recess and into the groove in said sealing ring whereby those portions of said sealing ring defining the sides of the groove are forced into sealing contact with the walls of said circular recess to thus prevent leakage of fluid from said fluid line around said operating stem and to seal fluid from contact with said packing composition without exerting axial forces on said valve plug.

3. A valve for use in high pressure fluid lines comprising a valve casing, a valve plug rotatably mounted in said casing, said valve plug having an operating stem projecting upwardly therefrom, an annular member surrounding said operating stem and secured to said valve casing in such position as to restrain said valve plug against axial movement, a circumferential recess between said annular member and said valve casing, a circular recess between said annular member and said operating stem, a grooved resilient sealing ring having a cross-section of substantially U-shape disposed in said circular recess in such manner that the grooved side faces away from that surface of said valve plug in contact with fluid in the fluid line, means for injecting a packing composition under pressure into said circumferential recess and into said circular recess between those portions of said sealing ring defining the sides of the groove therein whereby said portions are forced into sealing contact with said annular member and said operating stem to thus prevent leakage of fluid from the fluid line around said operating stem and to seal such fluid from contact with the packing composition without exertion of axial forces on said valve plug, while fluid under pressure in said circumferential recess prevents leakage of fluid between said annular member and said valve casing.

4. A valve for use in high pressure fluid lines comprising a valve casing, a valve plug rotatably mounted in said casing, said valve plug including an operating stem projecting from said casing, an annular member surrounding said operating stem and secured to said valve casing in such position as to restrain said valve plug against axial movement, a circumferential recess between said annular member and said valve casing, a circular recess between said annular member and said valve stem, a passageway connecting said recesses, a pair of resilient sealing rings each having an annular groove in one side thereof, said sealing rings being disposed in said circular recess in such manner that said lateral grooves face each other, means carried by said valve casing for injecting a packing composition under pressure into said circumferential recess, through said passageway and into said circular recess between the grooves in said sealing rings whereby said resilient sealing rings are urged into radial sealing engagement with said operating stem and said annular member to thus prevent leakage of fluid and packing composition around said operating stem without exertion of axial forces on said valve plug, and whereby packing composition under pressure in said circumferential recess prevents leakage of fluid between said annular member and said valve casing.

STANLEY H. ATKINSON.